July 2, 1935.　　G. V. V. DILLENBACK, JR　　2,006,796
TELEVISION MOTOR STRUCTURE
Filed May 20, 1930　　2 Sheets-Sheet 1
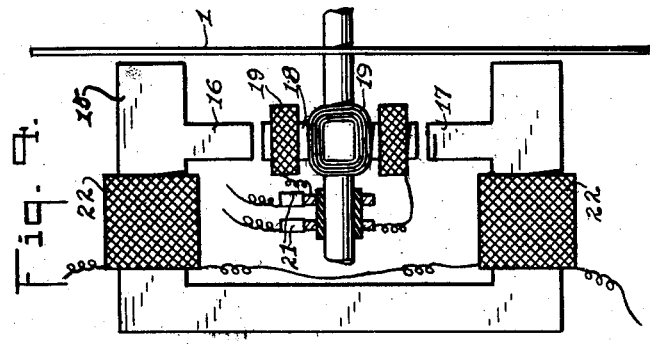
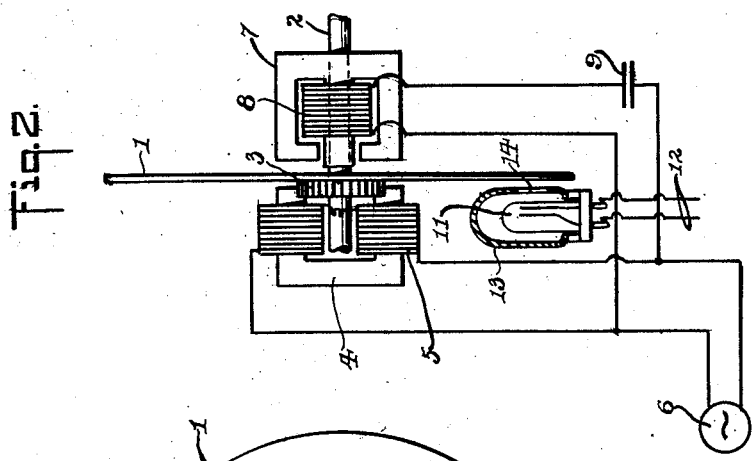
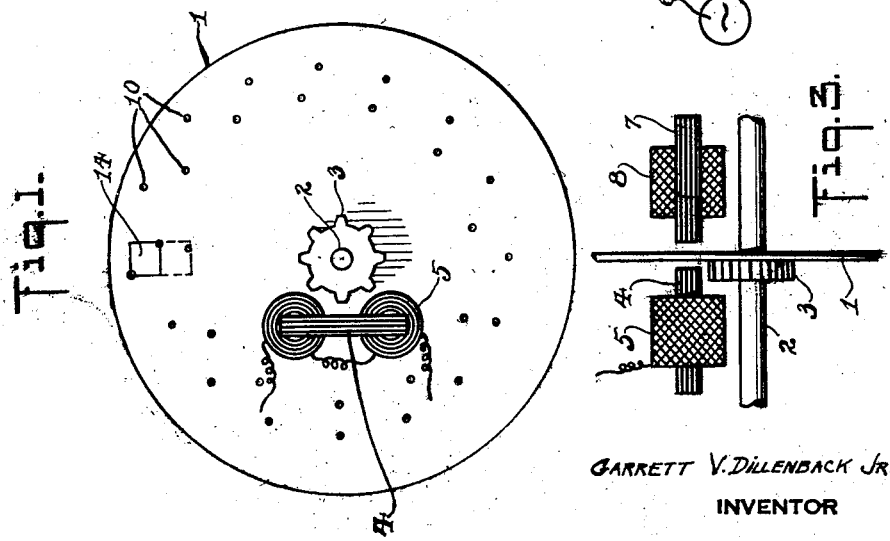
GARRETT V. DILLENBACK JR.
INVENTOR
BY Darby & Darby
ATTORNEYS.

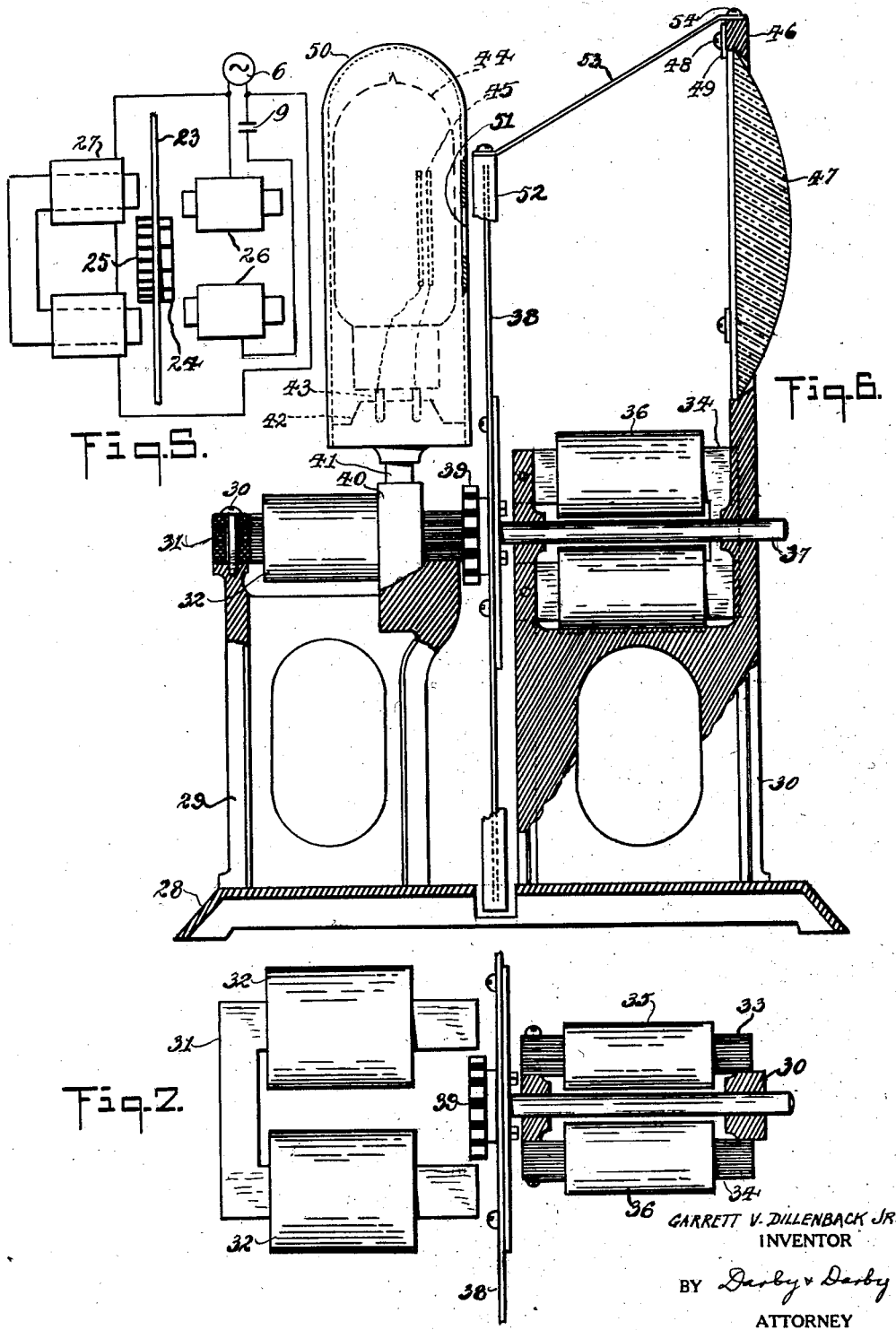

Patented July 2, 1935

2,006,796

UNITED STATES PATENT OFFICE 2,006,796

TELEVISION MOTOR STRUCTURE

Garrett Vander Veer Dillenback, Jr., Slingerlands, N. Y., assignor, by mesne assignments, to Radio Corporation of America, a corporation of Delaware Application May 20, 1930, Serial No. 453,890

10 Claims. (Cl. 178—69.5)

This invention relates to motor devices and with particularity to a novel type of motor suitable for use in electro-optical systems such as television, picture transmission, etc.

In certain of the signaling arts, for example television, photo-telegraphy, etc., it is required to operate receiving apparatus with a high degree of accuracy as regards synchronism with the transmitting apparatus. Particularly in the art of television is such accuracy of synchronism a pre-requisite to faithful reproduction of visual representations, since there must be both synchronism and isochronism between the transmitter and receiver. Furthermore, it is a pre-requisite in such systems to provide a driving mechanism for the signal transmitter and reproducer which responds with the utmost rapidity to correcting impulses in the event that the transmitter and reproducer tend to fall out of step.

Accordingly it is one of the principal objects of the present invention to provide a novel motive source for driving signal transmitting and/or reproducing devices.

Another object is to provide a method of driving signal transmitters and/or reproducers whereby the mechanisms may be corrected or synchronized within a minimum time interval.

While it has been proposed heretofore to synchronize receiving mechanism by synchronizing signals from the transmitting station these prior art methods have required relatively complex apparatus which requires careful adjustment for proper operation.

It is therefore another object of this invention to provide a synchronizing method particularly well suited to television systems, which method requires relatively inexpensive and simple apparatus. Accordingly the frequency components inherent in the image currents, and bearing a definite relation to the speed of the transmitter, may be used for synchronizing.

Another object of the invention is to provide a novel type of synchronous motor which is of simple construction, possesses a light movable member or rotor whereby its synchronous speed may be corrected with a maximum rapidity.

A feature of the invention relates to a motor of the induction type wherein the field magnet is employed for the double purpose of induction and synchronizing.

Another feature resides in a synchronous motor of the eddy-current type having a toothed or salient pole member which is adapted to be affected by the same field which creates the eddy-currents, to control the synchronous speed of the motor.

A further feature relates to an eddy-current motor of the rotating disc type wherein the disc is coupled to a member which controls the synchronous speed of the disc.

A still further feature relates to a television or facsimile system wherein the receiving mechanism is operated by a novel eddy-current motor which derives its power from the image or picture currents sent from a transmitting station, thus avoiding the use of a separate synchronizing channel.

Other features and advantages not specifically enumerated will be apparent after a consideration of the following descriptions and the appended claims.

In achieving the above and other advantages it is proposed to employ a device which combines the functions of a synchronous motor and an eddy-current motor. One of the inductors for the eddy-current motor is used as the stator of the synchronous motor.

The rotor of the synchronous motor may be of the usual form consisting of a toothed disc of solid or laminated iron or other paramagnetic material which may or may not be wound and may or may not have a direct current field. If a field is employed this may be supplied by passing direct current through windings on the stator or rotor or by using a separate stationary field winding or by permanently magnetizing the rotor or stator.

The eddy-current motor is made by placing the conducting disc in a rotating magnetic field. The rotating field is best produced by placing two wound cores with their ends near together and near the disc so that a varying flux in the cores will produce eddy currents in the disc, the currents opposite one core being displaced from those opposite the other, mechanically, in the desired direction of rotation. The flux in one core is made out of phase with the flux in the other core. This may be done by operating the coils on different phases of a polyphase supply or by tuning one coil with a condenser or by operating one coil in series with a large condenser or by operating one coil with high inductance as primary of a transformer and the other with low inductance as secondary or by any of the several well known methods. Both coils may be arranged on the same core or several cores may be used, on opposite sides or on the same side of the disc. The toothed synchronizing disc is so located that it is acted upon by the flux from one of the eddy-current motor inductors. It may be placed between two legs of one of the cores or near one of the legs. It may be used with any of the inductors.

The apparatus is economical to manufacture, can be easily changed from one synchronous speed to another by changing toothed discs and may be operated at speeds other than synchronous by adjusting the speed control. A separate synchronous motor may be attached for using picture or synchronizing signals for synchronizing. There are no moving contacts to cause trouble or noise. By using one toothed disc on one inductor and a different disc on another or the same inductor the motor may be made to synchronize on either of two speeds by adjusting the speed control.

Referring to the drawings:

Figure 1 shows a front view of a television receiving device embodying principles of the invention;

Fig. 2 is another view of the device of Fig. 1 showing more clearly the relations of the disc and driving magnets; this figure also shows schematically a television transmitter in conjunction with the receiving device;

Fig. 3 is another view of part of the device of Figs. 1 and 2;

Fig. 4 shows a modified embodiment of the invention;

Fig. 5 shows a modified manner of arranging the synchronizing rotors;

Fig. 6 is a detailed view of a complete televisor embodying the invention;

Fig. 7 is a partial plan view of Fig. 6.

Referring more particularly to Figs. 1 and 2, the numeral 1 represents a disc of metal such as copper, aluminum, etc. When the device is used for television purposes, as shown in Fig. 2, the disc is preferably of aluminum or other light metal capable of having eddy-currents induced therein. Disc 1 is attached to a shaft 2 which is mounted in suitable bearings (not shown). Fastened to disc 1 in any suitable manner is a toothed member 3 of paramagnetic material. The teeth are designed to function as salient poles and their number depends upon the speed at which the disc 1 is to be driven as will appear hereinafter. Mounted in close proximity to one face of the disc on any suitable support (not shown) and in cooperative relation with the poles of member 3, is an electro-magnet 4 comprising the U-shaped core, preferably of laminated iron. Magnet 4 is provided with a suitable field wiring 5 adapted to be energized by the synchronizing currents from source 6. Source 6 may take the form of a commercial alternating current supply main, or any other network common to both the transmitter and receiver. Mounted in close proximity to the opposite face of disc 1 is another electro-magnet 7 having preferably, although not necessarily, an E-shaped laminated core and a field winding 8. The winding 8 is connected to the source 6 and in series with the winding 5 through a condenser 9 whereby the currents flowing through the windings are displaced in phase. By well known principles, there will be eddy-currents produced in disc 1 due to both magnet 4 and magnet 7. Since the effects of these magnets are out of phase there is produced a torque on the disc 1 which therefore tends to rotate. It will be understood, of course, that instead of employing a condenser to displace the phase of the fields of the magnets any other manner of effecting this phase displacement may be employed.

While the disc 1 may be driven through suitable gears or couplings from shaft 2, it is preferred to employ the disc 1 itself as a television reproducing or analyzing device. Under these circumstances disc 1 is provided with a series of perforations or scanning elements 10, arranged in either a single spiral convolution, or in a plurality of convolutions. When the scanning elements are arranged in a single convolution in the manner of the Nipkow disc, then a single light source 11 is provided, this light source being varied in brilliancy in accordance with the image currents received over line or channel 12. If the scanning elements are arranged in a plurality of convolutions, then a light source and switching arrangement of the type disclosed in United States Patent #1,683,137 to C. F. Jenkins, may be employed. In order to expedite "framing" the lamp 11 may be provided with a slidable cover 13 having an aperture 14. The cover may be moved to expose the desired set of spiral perforations in the disc through the aperture 14.

Inasmuch as the poles or teeth of member 3 are within the influence of magnet 4, for each cycle of the alternating current applied to windings 5 and 8 there will be an impulse delivered to the member 3 and consequently to disc 1. The magnitude of this impulse will of course depend upon the relative phase displacement between the fields due to the magnets and the center line of each of the poles; consequently the member 3 will tend to run in perfect step with the frequency of the currents applied to the windings. However, the main driving power for disc 1 is derived from the action of the eddy-currents and the function of the device 3 coacting with magnets is merely to insure accurate synchronism with the supply.

It has been found that in these scanning methods there is inherent in the image currents themselves a frequency component which bears a definite relation to the speed of the transmitting scanner. For example, if an image is scanned by a disc scanner having 48 scanning elements effective per second, the image currents will have a corresponding characteristic frequency component. Similarly if the object being scanned is a motion picture film wherein 15 frames are scanned per second there will be in the image currents a characteristic component having a frequency of 15 cycles per second, as set forth in the copending application of C. E. Huffman, Serial No. 365,818. The image currents arriving at the receiving station after being demodulated and amplified may be applied to the reproducing lamp 11 and also to the windings 5 and 8.

Instead of applying the image currents with the characteristic inherent frequency to the magnets 5 and 8 these currents after suitable amplification may be used to operate a synchronous motor which is separate from the structure disclosed in the drawings but is coupled to the disc shaft 2 in any suitable manner, in which case the disc proper may be driven by induced eddy-currents derived from a local source of current. In other words the image currents serve to keep the disc in step while the eddy-currents serve as the main driving means for the disc proper.

While the synchronizing rotor member 3 as disclosed in Fig. 3 may be of permanently magnetized iron, it may be desired to employ electro-magnetic excitation. Thus as shown in Fig. 4 the disc 1 is driven by induced eddy-currents from the main magnet 15. The core of magnet 15 may be provided with inwardly extending pole portions 16, 17, which cooperate with the armature 18 affixed to shaft 2. Armature 18 may be of any well known construction as ordinarily employed in synchronous motors, and is energized by suitable windings 19 that are connected through brushes 21 to a source of constant current. The synchronizing currents for driving the disc 1 are applied to the main windings 22 causing the disc 1 to rotate, but the speed of rotation is controlled by the poles 16, 17 and the armature 18.

While two methods of using the main field winding to control the synchronous rotation of the disc are specifically disclosed it will be understood that the invention is not limited thereto. Thus instead of employing a toothed disc 3 as the synchronizing rotor in Figs. 1 and 2, the separate magnetic poles may be provided and attached to the disc.

Referring to Fig. 5, there is shown another modification of the invention wherein the disc 23 carries a pair of synchronizing rotors 24 and 25 on opposite sides thereof. Rotor 24 has a different number of teeth or polar projections from the member 25 in order that the disc 23 may be synchronously driven at correspondingly different speeds. Thus the member 24 may be designed to synchronize the disc 23 at 900 R. P. M. when a certain frequency of current is applied to the coils 26 and 27. While the member 25 may be designed to synchronize the disc 23 at a speed of 1200 R. P. M., for example, it will be obvious of course that the members 24 and 25 may be replaceably attached to the disc 23 in order to synchronize the said disc at any other speed, it being understood of course that a corresponding synchronizing member is used for such desired speed. In the embodiment of Fig. 5 it will be understood that the frequency of the alternating current applied to the members 26 and 27 will correspond to the particular one of the members 24 or 25 which it is desired be effective in synchronizing. It will also be understood that the members 24 and 25 are effective to produce their synchronizing action only when currents of the associated proper frequencies (or other frequencies within narrow limits) are applied to the inductors.

Referring to Figs. 6 and 7 there is shown in detail one preferred manner of supporting and arranging the elements of a complete televisor embodying features of the invention. In this figure the numeral 28 represents a supporting base of any suitable material having a pair of uprights 29 and 30 either attached thereto or formed integrally therewith as a single casting. The upright 29 has fastened thereto by suitable bolts 30 a U-shaped laminated magnet 31 provided with a pair of windings 32. Similarly attached to opposite sides of the upright 30 are two U-shaped magnets 33 and 34 provided with respective windings 35, 36. Mounted for rotation in the upright 30 is a shaft 37 which is preferably provided with anti-friction bearings in said uprights. Shaft 37 carries at its left hand end the scanning disc 38 and also the synchronizing rotor 39. As shown more clearly in Fig. 7 the rotor 39 is disposed between the opposite legs of the magnet 31 so as to be within the influence of the magnetic field therefrom. The upright 29 carries a bracket 40 to receive a plunger like extension 41 attached to a lamp socket or base 42 of insulating material. The plunger support 41 preferably is supported frictionally in the bracket 40 so that the base 42 may be raised and lowered to properly frame the picture vertically. Due to this method of supporting, the base may also be rotated to frame the picture horizontally. The base 42 is provided with suitable contact sockets to receive the contact prongs 43 of the glow lamp 44 which may be of the gaseous discharge type such as a neon lamp having a flat plate electrode 45. The upright 30 terminates at its upper end in a ring shaped portion 46 wherein is seated a large lens 47. The lens 47 being firmly held in place by means of suitable screws and washers 48 and 49 respectively.

In order to define the illumination or boundaries of the picture field the lamp 44 is surrounded by an opaque housing 50 which may be fastened to the base 42 by screws. Housing 50 is provided with the proper size of opening 51 to illuminate the scanning field traversed by the scanning apertures in the disc 38 in the well known manner. A suitable switch (not shown) for controlling the application of current to the magnet windings may be mounted on the front portion of the base 28 and a suitable rheostat (not shown) may also be mounted on the base to control the non-synchronous speed of the disc 38. The edge of disc 38 is protected by means of a flat ring of metal 52 which is fastened at its lower ends to the base 28 and is supported at its upper end by means of a metal strip 53 attached by screw 54 to the upper portion 46 of the upright 30.

It is believed that the operation of the mechanism disclosed in Figs. 6 and 7 will be understood when considered in connection with the description hereinabove given in connection with Figs. 1 to 5.

Furthermore, while the invention is shown as embodied in a television system, it will be understood that the broad concept of the invention wherein the same field acts as a motive source and as a synchronizing source is capable of embodiment in other arrangements which will be apparent to those familiar with the art.

The apparatus disclosed herein is relatively economical of manufacture and enables a machine to be readily changed from one synchronous speed to another, merely by substituting the proper toothed discs or synchronizing members, and furthermore the device may be operated at speeds other than synchronous speeds by merely adjusting the speed control. This necessarily follows because the members 24 and 25 attain their true synchronizing effect when their rotation is in step with the frequency of the supply.

What is claimed is:

1. A television device comprising a scanning disc, means for producing a magnetic field for driving said disc by eddy-current action on said disc and a synchronizing device controlled by said field.

2. A television device comprising a scanning disc serving as the rotor of an eddy-current motor, means for producing a magnetic field for driving said disc by eddy-current action therein, and means coupled to said disc for controlling the synchronous movement of said disc.

3. In combination a scanning disc, means for producing a magnetic field to drive said disc by eddy currents induced therein, and synchronizing means attached to the disc shaft, said synchronizing means comprising a plurality of magnetic poles adapted to be acted upon by the disc driving means.

4. In a television machine the combination of a support, a television scanning device mounted for rotation on said support, a pair of electro-magnets mounted adjacent opposite faces of said device, a synchronizing rotor coupled to said device and mounted to be within the field produced by one of said magnets, and means for producing displaced magnetic fields from said magnets.

5. In a television machine the combination of a television scanning device, means for producing displaced magnetic fields to drive said device asynchronously by eddy current induced therein, means for varying the asynchronous speed, and means including the first mentioned means and a synchronizing member for causing said device to rotate at synchronous speed.

6. In a television machine the combination of a rotatable television scanner device, a pair of electromagnets mounted adjacent one face of said device, and another electromagnet mounted adjacent the opposite face of said device, all of said electromagnets exerting an eddy current action on said scanner, and means for applying phase displaced currents to said pair of magnets and to said other magnet.

7. In combination a television scanning disc, a salient pole magnetic member coupled to the disc shaft, a pair of electro-magnets facing said disc for driving the same by inducing eddy currents therein, means for displacing the phase of the currents applied to said magnets, at least one of said magnets having its poles adjacent to said magnetic member.

8. In combination a rotatable television scanning device, a pair of electro-magnets mounted adjacent opposite faces of said scanner for inducing eddy currents therein, and means for applying phase displaced currents to said magnets to drive said device by inducing eddy currents in said device.

9. In combination a television scanning disc, a pair of salient pole magnetic members coupled to the disc shaft, a pair of electro-magnets facing said disc for driving the same by inducing eddy currents therein, means for displacing the phase of the currents applied to said magnets, one of said magnets having a pole adjacent to one of said magnetic members, the other of said magnets having a pole adjacent to the other of said magnetic members.

10. A television reproducing unit having a scanning disc, and means for operating said disc as the rotor of an eddy current motor.

GARRETT VANDER VEER DILLENBACK, JR.